US012738067B2

(12) United States Patent
Cai et al.

(10) Patent No.: US 12,738,067 B2
(45) Date of Patent: Sep. 15, 2026

(54) REAL-TIME MONITORING DEVICE FOR ACCUMULATED WATER DISTRIBUTION AND WATER FILM THICKNESS ON AIRPORT RUNWAY

(71) Applicant: Civil Aviation University of China, Tianjin (CN)

(72) Inventors: Jing Cai, Tianjin (CN); Kai Wang, Tianjin (CN); Bowen Sun, Tianjin (CN); Liyi Chen, Tianjin (CN); Mingyue Zhang, Tianjin (CN); Yuqi Jiang, Tianjin (CN); Zhiqiang Li, Tianjin (CN)

(73) Assignee: Civil Aviation University of China, Tianjin (CN)

( * ) Notice: Subject to any disclaimer, the term of this patent is extended or adjusted under 35 U.S.C. 154(b) by 201 days.

(21) Appl. No.: 18/820,296

(22) Filed: Aug. 30, 2024

(65) Prior Publication Data

US 2025/0384690 A1 Dec. 18, 2025

(30) Foreign Application Priority Data

Jun. 18, 2024 (CN) ......................... 202410790906.1

(51) Int. Cl.
*G06V 20/52* (2022.01)
*G06T 7/13* (2017.01)
*G06V 10/82* (2022.01)

(52) U.S. Cl.
CPC ................ *G06V 20/52* (2022.01); *G06T 7/13* (2017.01); *G06V 10/82* (2022.01); *G06T 2207/10048* (2013.01)

(58) Field of Classification Search
CPC .......... G06V 20/52; G06V 10/82; G06T 7/13; G06T 2207/10048
See application file for complete search history.

(56) References Cited

U.S. PATENT DOCUMENTS

2019/0086323 A1* 3/2019 Kanda .................... G01N 21/17
2020/0160736 A1* 5/2020 Moll ........................ G08G 5/21
2020/0340914 A1* 10/2020 Kanda ..................... G01W 1/00
2022/0057325 A1* 2/2022 Jin ......................... G06V 20/17
(Continued)

FOREIGN PATENT DOCUMENTS

EP 3951644 A1 * 2/2022 ............ G06V 20/58

*Primary Examiner* — John W Miller
(74) *Attorney, Agent, or Firm* — Bayramoglu Law Offices LLC

(57) ABSTRACT

A real-time monitoring device for an accumulated water distribution and water film thickness on an airport runway includes a protective cover, an infrared thermal imager, a camera, a far-infrared heater, and a data processing module. The data processing module is connected to the far-infrared heater, the camera, and the infrared thermal imager. The infrared thermal imager and the camera are all arranged at the upper end of the far-infrared heater. The far-infrared heater, the camera, and the infrared thermal imager are all arranged in the protective cover. The real-time monitoring device for the accumulated water distribution and water film thickness on the airport runway with the above structure has a long detection distance and is not limited by light conditions and can monitor the accumulated water distribution and water film thickness of airport runway in real-time.

7 Claims, 4 Drawing Sheets

(56) References Cited

U.S. PATENT DOCUMENTS

2022/0412887 A1* 12/2022 Kanda .................... G01S 17/88
2023/0360247 A1* 11/2023 Chew ........................ B64F 1/18
2025/0166516 A1* 5/2025 Kanagarajan ........... G08G 5/76

* cited by examiner

REAL-TIME MONITORING DEVICE FOR ACCUMULATED WATER DISTRIBUTION AND WATER FILM THICKNESS ON AIRPORT RUNWAY

CROSS REFERENCE TO THE RELATED APPLICATIONS

This application is based upon and claims priority to Chinese Patent Application No. 202410790906.1, filed on Jun. 18, 2024, the entire contents of which are incorporated herein by reference.

TECHNICAL FIELD

The invention relates to the technical field of monitoring devices, particularly a real-time monitoring device for an accumulated water distribution and water film thickness on an airport runway.

BACKGROUND

Water is widely distributed on roads and runways after rain, which threatens the driving safety of vehicles and aircraft. Especially in the landing stage of aircraft, a small change in the thickness of runway water film can induce aircraft to land and cause hydroplaning, which further leads to the occurrence of aircraft rushing out of runways. However, the measurement methods and corresponding theoretical research on the water film thickness of roads and airport runways are still not perfect, and the runway water has the characteristics of shallow water depth and uneven distribution of water film surface thickness, the existing water film thickness measuring instrument is subject to the measurement principle, it is difficult to meet the application requirements of airport runway surface in terms of accuracy and robustness. At present, the actual airport management personnel only through visual observation and personal experience assess the runway water accumulation area and approximate thickness, further decision-making aircraft landing, resulting in frequent airport water skiing safety accidents. Therefore, it is necessary to quantify the accumulated water distribution and thickness distribution on an airport runway under rainfall conditions to assist in the safe operation of the airport and the decision-making of the airport management.

The existing measurement methods of road water depth can be divided into contact measurement and non-contact measurement. Contact measurement is mainly divided into electronic water gauge and pressure water level sensor. Non-contact measurement mostly uses ultrasonic, radar, laser, and other water level gauges to realize water level measurement. The main disadvantage of the contact sensor is that it is susceptible to water accumulation and sediment pollution, which requires regular maintenance and replacement, the measurement results of the non-contact sensor are susceptible to environmental factors such as temperature and sediment pollution, resulting in increased measurement errors, the above types of measurement methods are not suitable for application in airport runway surface scenarios with strict clearance requirements.

SUMMARY

The purpose of the invention is to provide a real-time monitoring device for an accumulated water distribution and water film thickness on an airport runway, which can accurately monitor the accumulated water distribution and thickness of the runway cement area in real-time.

In order to achieve the above purpose, the invention provides a real-time monitoring device for an accumulated water distribution and water film thickness on an airport runway, comprising a protective cover, an infrared thermal imager, a camera, a far-infrared heater, and a data processing module, the data processing module is connected to the far-infrared heater, the camera, and the infrared thermal imager, the infrared thermal imager and the camera are arranged at an upper end of the far-infrared heater, and the far-infrared heater, the camera, and the infrared thermal imager are all arranged in the protective cover.

Preferably, the infrared thermal imager, the camera, and the far-infrared heater are connected to the protective cover through a mounting seat, and the infrared thermal imager and the camera are arranged in parallel.

Preferably, the infrared thermal imager and the camera are connected to an Internet of Things platform, and the Internet of Things platform is connected to the data processing module.

Preferably, a front end of the protective cover is provided with an opening, and a back end and an upper end of the protective cover are fixed.

Preferably, a battery pack is arranged in the protective cover, and the battery pack is connected to an infrared thermal imager, a camera, and a far-infrared heater.

Preferably, an establishment process of a processing model in the data processing module is as follows:

S1, collecting a visible light image and infrared image of the airport runway surface;

S2, establishing a three-dimensional digital matrix of the image based on the collected visible light image of accumulated water:

$$A(m\times n\times 3)=[a(i,j,k)]$$

wherein $A(m\times n\times 3)$ is a digital image matrix, m is a number of digital image rows, n is a number of digital image columns, and $a(i, j, k)$ is a digital value of a single pixel.

S3, establishing an image temperature matrix based on the collected infrared image of accumulated water:

$$T(p\times q)=[t(i,j)]$$

wherein $T(p\times q)$ is the image temperature matrix, p is the number of infrared image rows, q is the number of infrared image columns, and $t(i, j)$ is the digital value of a single pixel.

S4, performing an image segmentation on the established three-dimensional digital matrix of the image based on a pre-trained semantic segmentation neural network;

S5, performing a gray-scale transformation based on the temperature matrix;

S6, performing an edge detection processing based on the image temperature matrix after gray-scale transformation;

S7, performing a clustering analysis and edge detection based on the image temperature matrix after gray-scale transformation;

S8, fusing and transforming the digital image after edge detection of S6 and S7;

S9, filling the image after fusion transformation to obtain a water accumulation area;

S10, using the far-infrared heater to conduct a temperature thermal excitation on the water accumulation area;

S11, collecting the infrared thermal image of the water accumulation area after temperature excitation;

S12, calculating a water film thickness according to a temperature transformation curve of each pixel point.

Preferably, the calculation method for water film thickness is as follows:

$$h = A\ln(T - T_0) + B$$

wherein T is a test temperature of the water film surface (° C.); h is a water film thickness (mm); $T_0$ is a minimum surface temperature (° C.) of a water accumulation range after thermal excitation, which needs to be determined during each test; A and B are regression coefficients, which need to be determined by water accumulation boundary fitting in S8.

Therefore, the invention adopts a real-time monitoring device for accumulated water distribution and water film thickness on the airport runway with the above structure, which has the following beneficial effects:

(1) The high-definition camera and infrared thermal imager are used to collect data images, on the one hand, it can realize non-contact long-distance monitoring and meet the requirements of airport runway clearance control, on the other hand, the infrared thermal imager can capture images without the limitation of light conditions, and the high-definition camera captures images with clear imaging, the combination of the two devices can achieve all-weather monitoring requirements.

(2) The pre-trained deep learning semantic segmentation network is used to realize the segmentation of the water accumulation area of the collected images, under the processing conditions of real-time monitoring, the water accumulation area can be accurately segmented.

(3) Through the far-infrared heater, the water accumulation area of the reference image is uniformly heated at a long distance, and the water film thickness is calculated by the degree of surface temperature change, which has high robustness.

(4) The protective cover designed by the invention can prevent dust, wind, and water on the one hand, and avoid the influence of dust and rainwater on the clarity of the collected pictures, on the other hand, the protective cover plays a supporting and fixing role to avoid the relative position change between the infrared thermal imager, the camera and the far-infrared heater.

The following is a further detailed description of the technical scheme of the invention through drawings and an embodiment.

MARKS IN THE FIGURES

Figure 1:
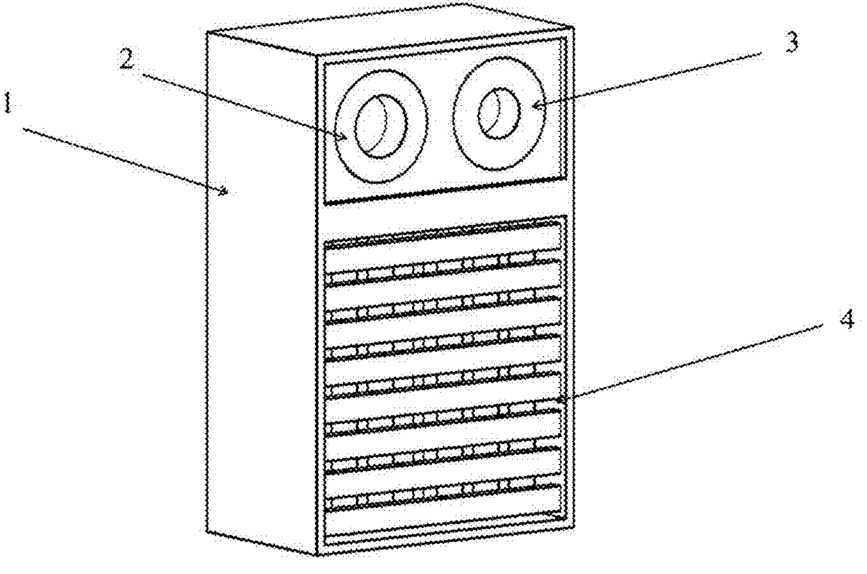
FIG. 1 is a structural schematic diagram of the embodiment of the real-time monitoring device for the accumulated water distribution and water film thickness on the airport runway.
Figure 2:
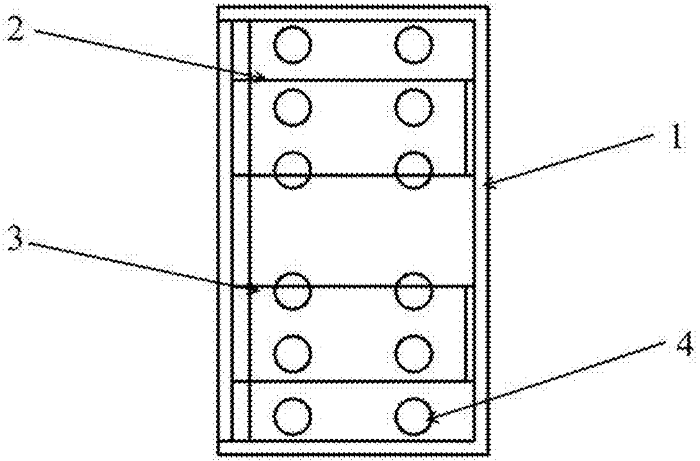
FIG. 2 is a side view of the embodiment of the real-time monitoring device for the accumulated water distribution and water film thickness on the airport runway.
Figure 3:
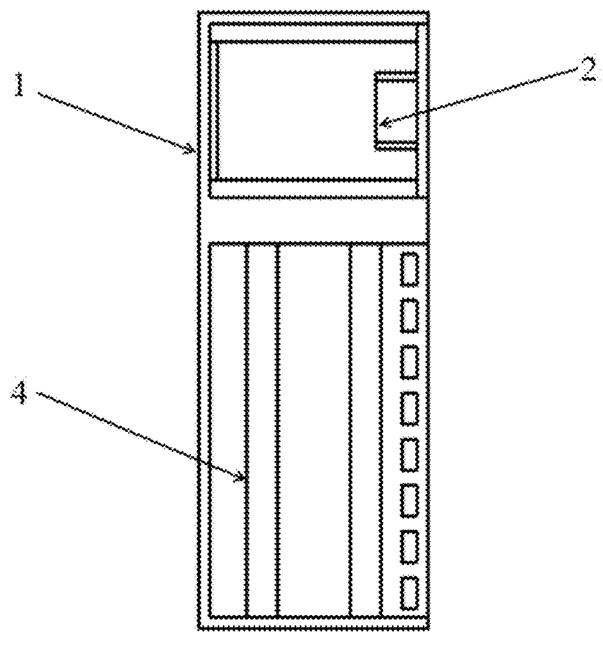
FIG. 3 is a top view of the embodiment of the real-time monitoring device for the accumulated water distribution and water film thickness on the airport runway.
Figure 4:
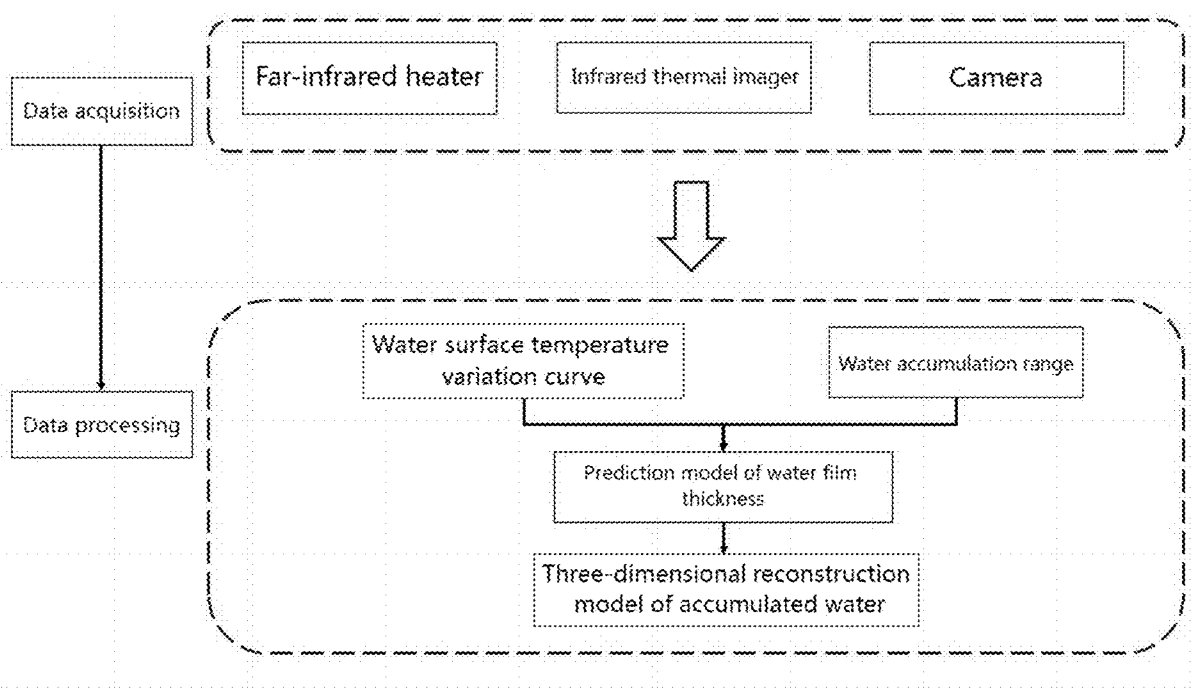
FIG. 4 is a technical scheme roadmap of the detection device in the invention.
Figure 5:
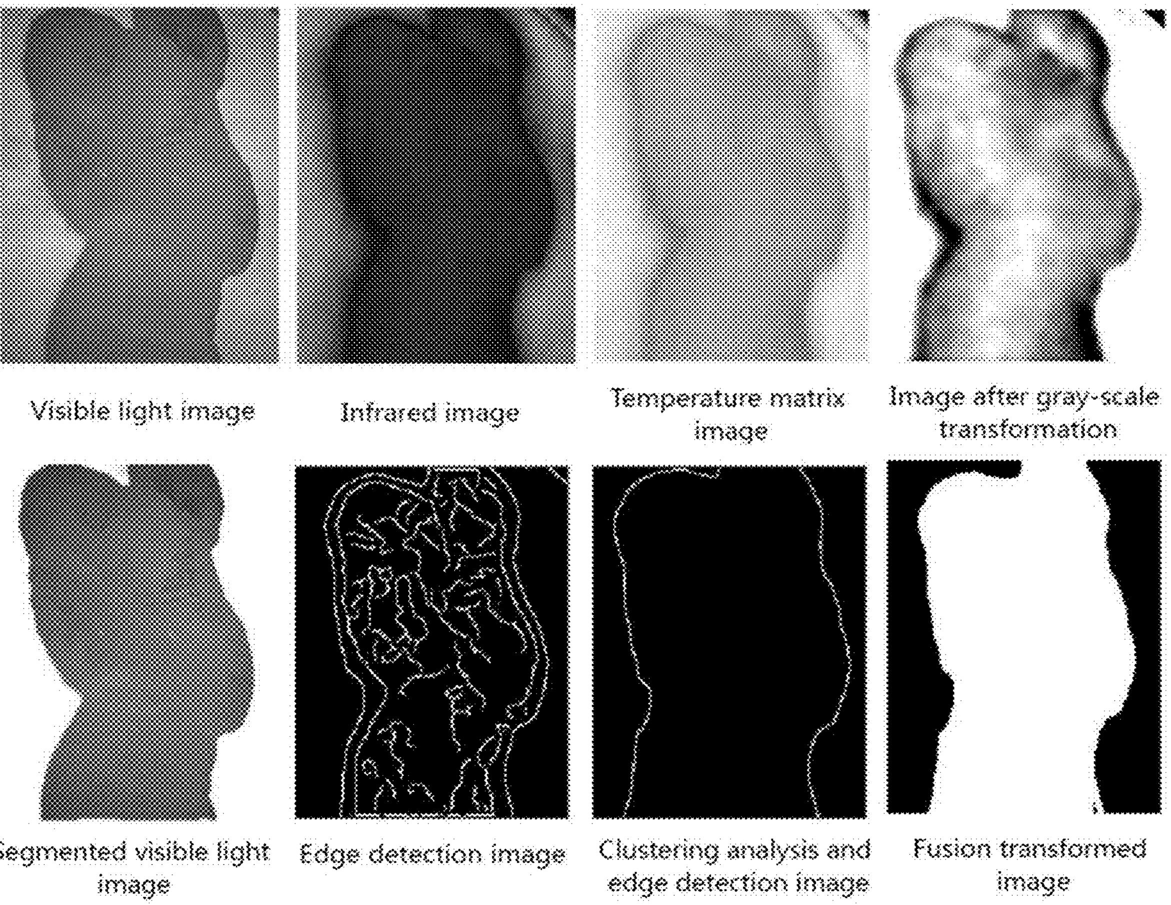
FIG. 5 is an image-processing process diagram of the water accumulation in the embodiment of the invention.
Figure 6:
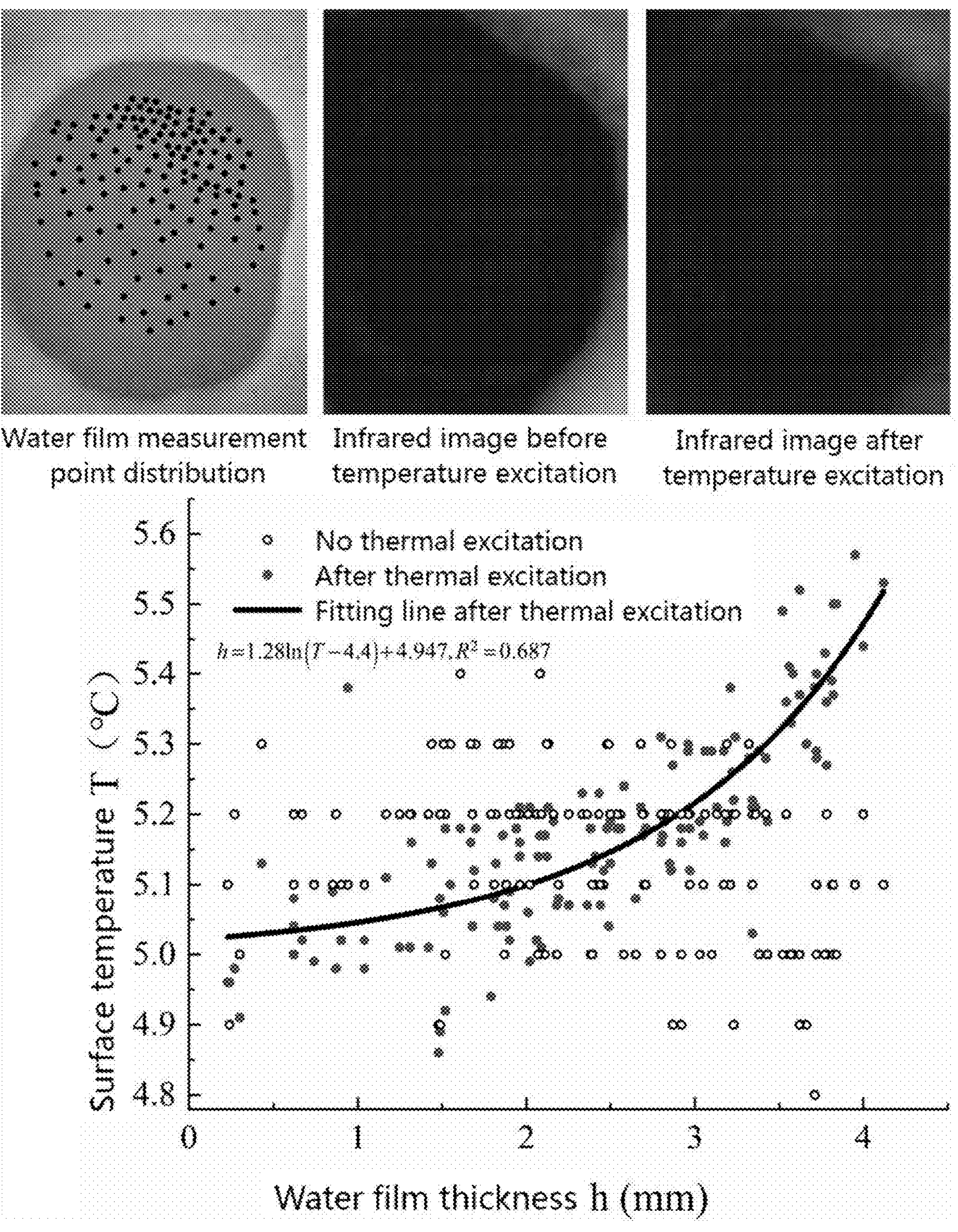
FIG. 6 is an estimated measurement result of the water film thickness in the embodiment of the invention.

1, protective cover; 2, infrared thermal imager; 3, camera; 4, far-infrared heater.

DETAILED DESCRIPTION OF THE EMBODIMENTS

The following is a further explanation of the technical scheme of the invention through drawings and an embodiment.

Unless otherwise defined, the technical terms or scientific terms used in the invention should be understood by people with general skills in the field to which the invention belongs. The words first, second and the like used in this invention do not represent any order, quantity, or importance, but are only used to distinguish different components. Similar words such as include or including mean that the elements or objects appearing before the word cover the elements or objects listed after the word and their equivalents, without excluding other elements or objects. Similar terms such as connected or connecting are not limited to physical or mechanical connections but can include electrical connections, whether direct or indirect. Up, down, left, right, etc. are only used to represent the relative positional relationship, when the absolute position of the described object changes, the relative positional relationship may also change accordingly.

EMBODIMENT

The invention provides a real-time monitoring device for an accumulated water distribution and water film thickness on an airport runway, comprising a protective cover 1, an infrared thermal imager 2, a camera 3, a far-infrared heater 4 and a data processing module, the data processing module is connected to the far-infrared heater 4, the camera 3, and the infrared thermal imager 2, the data processing module processes the image data collected in infrared thermal imager 2 and substitutes it into the reference model to obtain the water film thickness, the infrared thermal imager 2 and the camera 3 are arranged at the upper end of the far-infrared heater 4, and the far-infrared heater 4, the camera 3, and the infrared thermal imager 2 are all arranged in the protective cover 1, the setting of the protective cover 1 ensures that it avoids external damage, the material of the protective cover 1 is a material with high hardness, such as engineering plastics, stainless steel, etc., so that the infrared thermal imager 2, camera 3, and far-infrared heater 4 are not easy to damage in the environment of bumpy vibration and bumpy environment, and the relative position remains fixed. The role of the far infrared heater 4 is to uniformly heat the water accumulation area of the reference image over a long distance, and the water film thickness is calculated by the degree of surface temperature change.

The infrared thermal imager 2, camera 3, and far-infrared heater 4 are all connected to the protective cover 1 through the mounting seat, the far-infrared heater 4 is a far-infrared heater with radiation heating and radiation field heating function, the infrared thermal imager 2 and the camera 3 are set in parallel, the infrared thermal imager 2 is a passive infrared thermal imager with zoom and video recording functions, the camera 3 is a zoom high-definition camera, the high-definition camera, and the infrared thermal imager are used to collect data images together, which can not only realize non-contact long-distance monitoring and meet the requirements of airport runway clearance control. It is also realized that the infrared thermal imager can collect images without the limitation of light conditions, and the high-definition camera can collect images with clear imaging, the combination of the two devices can achieve all-weather monitoring requirements.

The infrared thermal imager 2 and camera 3 are connected to the Internet of Things platform, and the data collected by the infrared thermal imager 2 and camera 3 are uploaded to the Internet of Things cloud platform, the Internet of Things platform communicates with the data processing module for users to access the Internet of Things cloud platform to obtain data.

The front end of the protective cover 1 is provided with an opening, and the back end and the upper end of the protective cover 1 are fixed, which is convenient to be placed on the runway detection vehicle to detect the water film thickness.

The battery pack is set in the protective outer cover 1, and the battery pack is connected to the infrared thermal imager 2, the camera 3, and the far infrared heater 4 to provide power for it.

The establishment process of the processing model in the data processing module is as follows:

S1, the visible light image and infrared image of the airport runway surface are collected;

S2, the three-dimensional digital matrix of the image is established based on the collected visible light image of accumulated water:

$$A(m \times n \times 3) = [a(i, j, k)]$$

wherein A(m×n×3) is the digital image matrix, m is the number of digital image rows, n is the number of digital image columns, and a(i, j, k) is the digital value of a single pixel.

S3, the image temperature matrix is established based on the collected infrared image of accumulated water:

$$T(p \times q) = [t(i, j)]$$

wherein T(p×q) is the image temperature matrix, p is the number of infrared image rows, q is the number of infrared image columns, and t(i, j) is the digital value of a single pixel.

S4, the image segmentation is performed on the established three-dimensional digital matrix of the image based on a pre-trained semantic segmentation neural network;

S5, the gray-scale transformation is performed based on the temperature matrix;

S6, the edge detection processing is performed based on the image temperature matrix after gray-scale transformation;

S7, the clustering analysis and edge detection are performed based on the image temperature matrix after gray-scale transformation;

S8, the digital image after edge detection of S6 and S7 is fused and transformed S9, the image after fusion transformation is filled to obtain the water accumulation area;

S10, the far-infrared heater is used to conduct the temperature thermal excitation on the water accumulation area;

S11, the infrared thermal image of the water accumulation area is collected after temperature excitation;

S12, calculating the water film thickness is calculated according to the temperature transformation curve of each pixel point.

The calculation method of water film thickness is as follows:

$$h = A\ln(T - T_0) + B$$

wherein T is a test temperature of the water film surface (° C.); h is a water film thickness (mm); $T_0$ is a minimum surface temperature (° C.) of a water accumulation range after thermal excitation, which needs to be determined during each test; A and B are regression coefficients, which need to be determined by water accumulation boundary fitting in S8.

Therefore, the invention adopts a real-time monitoring device for accumulated water distribution and water film thickness in airport runway with the above structure, and uses a high-definition camera and an infrared thermal imager to collect data images together, on the one hand, it can realize non-contact long-distance monitoring and meet the requirements of airport runway clearance control, on the other hand, the infrared thermal imager can capture images without the limitation of light conditions, and the high-definition camera captures images with clear imaging, the combination of the two devices can achieve all-weather monitoring requirements. The invention uses a pre-trained deep-learning semantic segmentation network to realize the segmentation of the water accumulation area of the collected pictures, and can accurately segment the water accumulation area under the processing conditions of real-time monitoring. The invention uses a far-infrared heater to uniformly heat the water accumulation area of the reference image for a long distance and calculates the thickness of the water film by the degree of surface temperature change, which has high robustness. The protective cover designed by the invention can prevent dust, wind, and water on the one hand, and avoid the influence of dust and rainwater on the clarity of the collected pictures, on the other hand, the protective cover plays a supporting and fixing role to avoid the relative position change between the infrared thermal imager, the camera and the far-infrared heater.

Finally, it should be explained that the above embodiment is only used to explain the technical scheme of the invention rather than restrict it, although the invention is described in detail concerning the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. A real-time monitoring device for an accumulated water distribution and a water film thickness on an airport runway, comprising a protective cover, an infrared thermal imager, a camera, a far-infrared heater, and a data processing module, wherein the data processing module is connected to the far-infrared heater, the camera, and the infrared thermal imager; the infrared thermal imager and the camera are arranged at an upper end of the far-infrared heater; and the far-infrared heater, the camera, and the infrared thermal imager are arranged in the protective cover.

2. The real-time monitoring device for the accumulated water distribution and the water film thickness on the airport runway according to claim 1, wherein the infrared thermal imager, the camera, and the far-infrared heater are connected to the protective cover through a mounting seat, and the infrared thermal imager and the camera are arranged in parallel.

3. The real-time monitoring device for the accumulated water distribution and the water film thickness on the airport runway according to claim 2, wherein the infrared thermal imager and the camera are connected to an Internet of Things platform, and the Internet of Things platform is connected to the data processing module.

4. The real-time monitoring device for the accumulated water distribution and the water film thickness on the airport runway according to claim 3, wherein a front end of the protective cover is provided with an opening, and a back end and an upper end of the protective cover are fixed.

5. The real-time monitoring device for the accumulated water distribution and the water film thickness on the airport runway according to claim 4, wherein a battery pack is arranged in the protective cover, and the battery pack is connected to the infrared thermal imager, the camera, and the far-infrared heater.

6. The real-time monitoring device for the accumulated water distribution and the water film thickness on the airport runway according to claim 5, wherein an establishment process of a processing model in the data processing module is as follows:

S1, collecting a visible light image and an infrared image of an airport runway surface;

S2, establishing a three-dimensional digital matrix of an image based on the visible light image of accumulated water:

$$A(m \times n \times 3) = [a(i, j, k)]$$

wherein A(m×n×3) is the three-dimensional digital matrix of the image, m is a number of digital image rows, n is a number of digital image columns, and a(i, j, k) is a digital value of a first single pixel;

S3, establishing an image temperature matrix based on the infrared image of the accumulated water:

$$T(p \times q) = [t(i, j)]$$

wherein T(p×q) is the image temperature matrix, p is a number of infrared image rows, q is a number of infrared image columns, and t(i, j) is a digital value of a second single pixel;

S4, performing an image segmentation on the three-dimensional digital matrix of the image based on a pre-trained semantic segmentation neural network;

S5, performing a gray-scale transformation based on the temperature matrix;

S6, performing an edge detection processing based on the image temperature matrix after the gray-scale transformation;

S7, performing a clustering analysis and edge detection based on the image temperature matrix after the gray-scale transformation;

S8, fusing and transforming a digital image after edge detection of S6 and S7;

S9, filling the image after the fusion transformation to obtain a water accumulation area;

S10, using the far-infrared heater to conduct a temperature thermal excitation on the water accumulation area;

S11, collecting the infrared thermal image of the water accumulation area after the temperature thermal excitation; and S12, calculating the water film thickness according to a temperature transformation curve of each pixel point.

7. The real-time monitoring device for the accumulated water distribution and the water film thickness on the airport runway according to claim 6, wherein a calculation method for the water film thickness is as follows:

$$h = A\ln(T - T_0) + B$$

wherein T is a test temperature of a water film surface and has a unit of ° C.; h is the water film thickness and has a unit of mm; $T_0$ is a minimum surface temperature of a water accumulation range after the temperature thermal excitation and has a unit of ° C., wherein $T_0$ needs to be determined during each test; A and B are regression coefficients, wherein A and B need to be determined by water accumulation boundary fitting in S8.

* * * * *